No. 879,513. PATENTED FEB. 18, 1908.
J. H. B. BRYAN.
PIPE TAPPING DEVICE.
APPLICATION FILED JAN. 18, 1906.
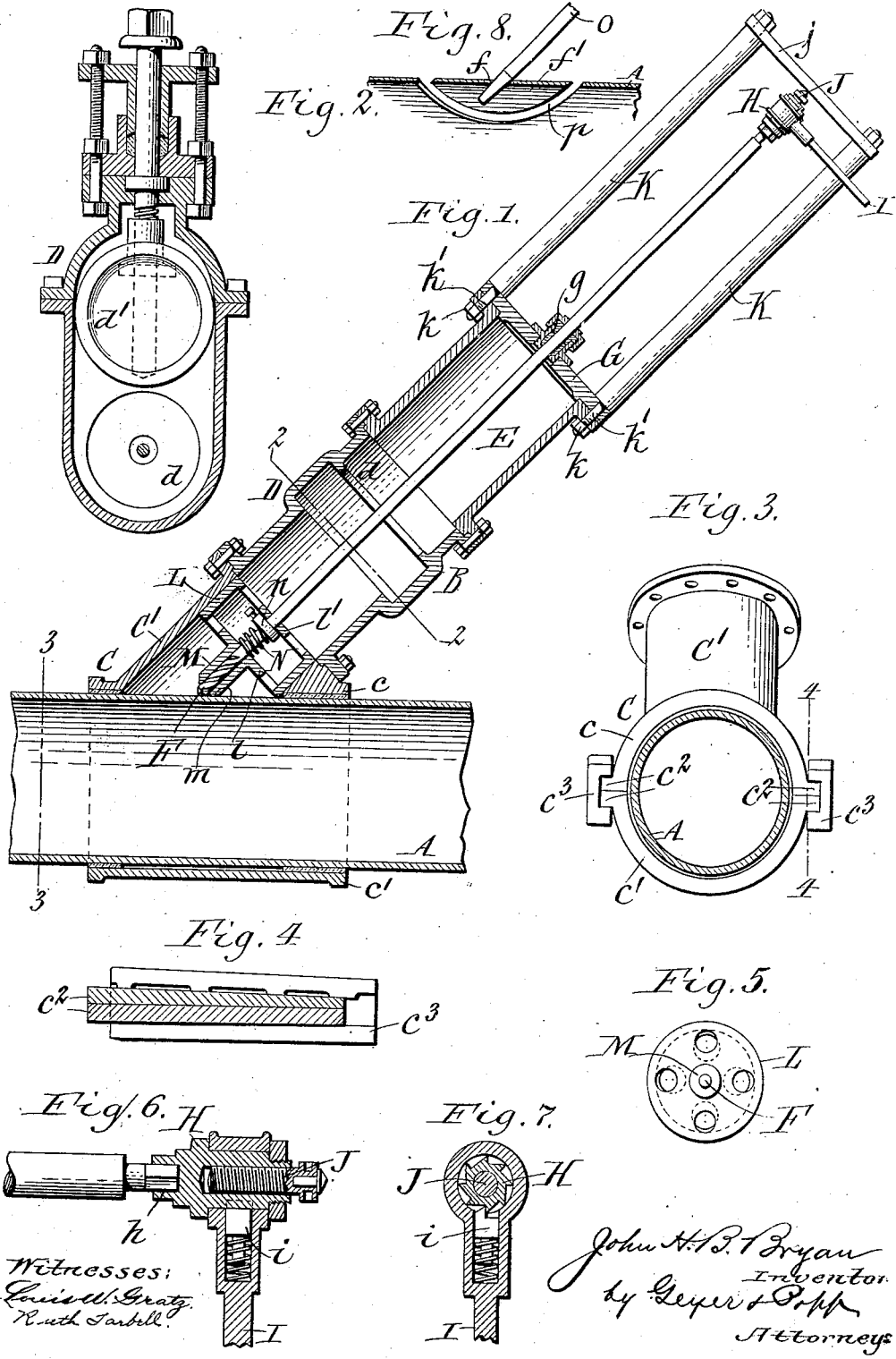

UNITED STATES PATENT OFFICE.

JOHN H. B. BRYAN, OF BUFFALO, NEW YORK, ASSIGNOR, BY DIRECT AND MESNE ASSIGN-
MENTS, OF ONE-THIRD TO NICHOLAS J. KELLY AND ONE-THIRD TO NORA KELLY, OF
BUFFALO, NEW YORK.

PIPE-TAPPING DEVICE.

No. 879,513.   Specification of Letters Patent.   Patented Feb. 18, 1908.

Application filed January 18, 1906. Serial No. 296,634.

*To all whom it may concern:*

Be it known that I, JOHN H. B. BRYAN, a citizen of the United States, residing at Buffalo, in the county of Erie and State of New York, have invented a new and useful Improvement in Pipe-Tapping Devices, of which the following is a specification.

When cutting out a section of a main water pipe for connecting the same with a branch pipe while under pressure, the detached section or "patch" is liable to be carried away and interfere with the water system. To prevent this a preliminary opening is bored or drilled into the central part of the "patch" or section in which a retaining rod is secured preparatory to severing the same from the main pipe whereby the "patch" is prevented from being lost.

The object of this invention is to provide a simple, durable and reliable device for expeditiously and accurately boring the central opening in the section of the main pipe which is to be removed to permit of inserting therein the retaining rod above referred to.

In the accompanying drawings: Figure 1 is a longitudinal section showing the boring device in position for cutting or drilling the central opening in the section of the main pipe to be removed. Figs. 2 and 3 are transverse sections in lines 2—2, and 3—3, Fig. 1, respectively. Fig. 4 is a longitudinal section in line 4—4, Fig. 3. Fig. 5 is a detached front view of the drill and its guide. Fig. 6 is a fragmentary longitudinal section of the ratchet mechanism for intermittently rotating the boring or drill shaft. Fig. 7 is a cross section thereof. Fig. 8 is a fragmentary sectional view showing the "patch" cut out of the main pipe and the retaining rod connected therewith.

Similar letters of reference indicate corresponding parts throughout the several views.

My invention is applicable for boring or drilling a main pipe regardless of the angle of the branch pipe relative to the main pipe but in the drawings a construction is shown which is intended for boring the main pipe preparatory to connecting the same with a branch pipe which is arranged at an angle of forty five degrees relatively thereto.

A represents the main water pipe with which a branch pipe B is to be connected. The initial portion of this branch pipe consists of a tee-fitting or coupling C the head of which embraces the main pipe, a gate valve D having one end of the passage $d$ in its body connected with the angle branch C of the tee-fitting and a short section E of the pipe, connected at its inner end with the other end of the passage of the valve body.

In order to apply the head of the tee-fitting to the main pipe the same is divided lengthwise and diametrically into two sections $c$, $c'$ which are applied to opposite sides of the main pipe. Various means may be employed for connecting the head sections of the tee-fitting and securing them to the main pipe, the means for this purpose shown in the drawings consisting of longitudinal flanges $c^2$ formed on the opposing longitudinal edges of the tee-head sections and grooved coupling bars or clips $c^3$ each of which fits with its groove over a pair of said flanges on one side of the head section. The operative faces of the flanges and the coupling bars converge lengthwise so that the two flanges of each pair are drawn together upon moving the coupling bar lengthwise relatively thereto in a well known manner.

F represents the cutter, drill or boring tool whereby the central opening $f$ is produced in the patch or section $f'$ which is to be removed from the main pipe. This drill is formed on or secured to the inner or front end of a boring bar, rod or shaft which is arranged axially in the branch pipe and projects with its outer or rear end beyond the rear end of the branch pipe.

G represents a head or cap which is secured to the rear end of the branch pipe and closes the same tightly. This head is provided centrally with a stuffing box $g$ through which passes the central part of the boring rod.

Any suitable means may be employed for rotating the boring rod and the drill attached thereto and also advancing these parts as the boring operation progresses. An ordinary ratchet mechanism answers the purpose, that shown in the drawings being one of this kind and consisting essentially of a rotary body H provided in its front end with a flat sided socket $h$ which receives the correspondingly shaped rear end of the boring rod or shaft, an oscillating handle I mounted on the ratchet body, a spring pawl $i$ mounted on the handle and engaging with the ratchet teeth on the body and a feed screw J working axially in an opening in the rear end of the body and bearing against a stationary abutment $j$. This abutment preferably consists of a cross bar which is connected on opposite sides of the drill shaft with the rear head G and the rear end of the branch pipe section E by means of distance or stay rods K.

In order to hold the drill accurately in its central position within the branch of the tee-fitting, a guide device therefor is provided which is preferably constructed as follows: L represents a cylindrical guide barrel or body provided with front and rear heads or spiders $l, l'$ and M a central bearing sleeve projecting forwardly from the front head of the guide barrel. The drill is journaled in the sleeve M and the front part of the drill shaft is journaled centrally in the heads of the guide barrel. Normally the drill guide is yieldingly held in its foremost position relatively to the drill and its shaft in which position the front end of the drill projects slightly beyond the front end of the guide sleeve. This yielding connection is preferably produced by means of a spring N surrounding the drill shaft between the outer side of the front head and a collar $n$ on the drill shaft. This collar is engaged normally by the front side of the rear head $l'$ and serves to limit the forward movement of the guide relatively to the drill. When the branch pipe is arranged at an oblique angle to the main pipe, the front end of the guide sleeve is beveled correspondingly as shown at $m$ in Fig. 1. In producing the opening in the main pipe by means of this boring device the operation proceeds as follows: After the tee-fitting, gate valve and short section of the branch pipe have been connected with each other and with the main pipe the front end of the drill shaft is passed forwardly through the branch pipe into the branch of the tee-fitting while the gate $d'$ of the valve is open. The head G is passed over the outer part of the drill shaft and secured to the outer end of the short pipe section E by means of the nuts $k$ and screw shanks $k'$ at the front ends of the distance rods. The drill shaft is now rotated by means of the ratchet mechanism and also advanced by the feed screw J whereby an opening is bored in the central part of the section or "patch" of the main pipe which is to be removed. During this operation the drill and the front end of the drill rod are centered within the branch of the tee-fitting by means of the guide sleeve and barrel. In order to hold the drill accurately in this central position the bore of the tee-fitting branch is machined and the guide barrel is fitted snugly into the same.

As the drill moves forward in cutting or boring the central opening in the main pipe, the spring N is compressed causing the front end of the guide sleeve to be held firmly in engagement with the main pipe adjacent to the drill, thereby preventing lateral deflection of the same and insuring boring of the hole in a perfectly central position and axially in line with the branch pipe. The instant the drill passes through the main pipe water passes from the main pipe through the opening into the branch pipe but cannot escape therefrom owing to the head G which tightly closes the same. The ratchet mechanism and abutment bar are now removed to permit of drawing the drill shaft outwardly or rearwardly together with the drill and the guide surrounding the same. During this outward movement of the drill shaft the guide is compelled to move with the same by the collar $n$ on the shaft engaging with the rear head of the guide barrel. These parts are moved rearwardly in this manner until the drill and its guide are in the branch pipe outside of the gate way of the valve. Upon now closing the gate $d'$ of the valve, the water pressure is cut off from the part of the branch pipe beyond the outer side of the gate valve, thereby permitting the head at the outer end of the branch pipe to be removed together with the distance rods and the drill shaft and guide without discharging any more water than is contained in the short section E of the branch pipe. A retaining rod $o$ is inserted in the opening $f$ and a cutter mechanism such as shown in my pending application No. 304,532 filed March 6, 1906, is employed for producing a circular cut or kerf $p$ in the main pipe around the opening $f$ for severing the "patch" $f'$ from the main pipe. As described in said co-pending application the front parts of the retaining rod and cutter mechanism are first introduced into the outer part of the branch pipe after which the latter is closed by a suitable head. The gate of the valve is then opened to permit of inserting the retaining rod $o$ into the opening $f$ and engaging the kerf cutting mechanism with the main pipe. After the "patch" has been severed the same together with the retaining rod and cutter mechanism is first moved into the rear part of the branch pipe and the gate valve is then closed thereby permitting of opening the outer end of the branch pipe and removing the above mentioned parts from the same without interrupting the main water supply system.

The pipe section E may be left attached to the gate valve D and form a permanent part of the branch water pipe or the same may be removed with the head G and the stay rods K, K attached thereto in which latter case the section E forms a portable part of the boring tool.

When making connection between branch water pipes of different diameters and a main pipe it is necessary to use guide barrels L of larger or smaller diameter to suit the branch pipe. A pipe section E of corresponding diameter may also be used but if the size of the branch pipe to be connected is smaller than the pipe section E a pipe reducer of well known construction may be employed for obtaining the right size to fit the guide barrel L of small diameter.

I claim as my invention:

1. A device for producing an opening in a main pipe within a branch pipe, comprising a cutter adapted to be arranged axially within the branch pipe, a guide for said cutter adapted to engage with the bore of the branch pipe and also with the main pipe around the cutter, and means operating to force said guide against the main pipe as the cutter advances and penetrates the main pipe, substantially as set forth.

2. A device for producing an opening in a main pipe within a branch pipe, comprising a cutter adapted to be arranged axially in the branch pipe, a guide for said cutter which is adapted to engage with the bore of the branch pipe and also with the outer side of the main pipe next to the cutter, and means operating to hold said guide yieldingly against said main pipe, substantially as set forth.

3. A device for producing an opening in a main pipe within a branch pipe, comprising a cutter adapted to be arranged axially in the branch pipe, a guide for said cutter having an enlarged cylindrical rear part which is adapted to engage with the bore of the branch pipe and a reduced tubular front part which is adapted to bear against the outer side of the main pipe close to the cutter, and a spring interposed between said cutter and guide and operating to yieldingly press said guide against the outer side of the main pipe, substantially as set forth.

4. A device for producing an opening in a main pipe for connecting the same with a branch pipe arranged at an angle thereto, comprising a cutter adapted to be arranged axially in the branch pipe, a guide for said cutter which surrounds the same and consists of a hollow cylindrical rear part adapted to engage the bore of said branch pipe and a tubular front part having a forwardly tapering front end which is adapted to engage with the outer side of the main pipe next to the cutter, and a spring surrounding the cutter within the hollow rear part of the guide and operating to press the guide yieldingly against the main pipe, substantially as set forth.

Witness my hand this 8th day of January, 1906.

JOHN H. B. BRYAN.

Witnesses:
 THEO. L. POPP,
 E. M. GRAHAM.